United States Patent [19]

Peerman et al.

[11] 4,217,256

[45] Aug. 12, 1980

[54] POLYAMIDE ADHESIVE FOR BONDING FABRICS

[75] Inventors: Dwight E. Peerman, Minnetonka; H. Gordon Kanten, Minneapolis, both of Minn.

[73] Assignee: Henkel Corporation, Minneapolis, Minn.

[21] Appl. No.: 938,683

[22] Filed: Aug. 31, 1978

Related U.S. Application Data

[63] Continuation-in-part of Ser. No. 876,601, Feb. 10, 1978, abandoned.

[51] Int. Cl.³ .............................................. C08L 77/08
[52] U.S. Cl. ................................. 260/18 N; 156/331
[58] Field of Search ...................... 260/18 N; 156/331

[56] References Cited

U.S. PATENT DOCUMENTS

| 3,772,136 | 11/1973 | Workman | 161/169 |
| 3,859,234 | 1/1975 | Peerman | 260/18 N |
| 4,045,389 | 8/1977 | Drawent et al. | 260/18 N |

Primary Examiner—Maurice J. Welsh
Attorney, Agent, or Firm—Patrick J. Span

[57] ABSTRACT

There is disclosed a polyamide adhesive for bonding fabrics, particularly fusible interliners for fabrics, which are cleanable by laundering and/or dry cleaning. The polyamide adhesive is a terpolyamide of caprolactam and hexamethylene diamine with a mixture of polymeric fat acids and an aliphatic co-dicarboxylic acid having 20–22 carbon atoms.

14 Claims, No Drawings

POLYAMIDE ADHESIVE FOR BONDING FABRICS

This application is a continuation-in-part application on our corresponding application Ser. No. 876,601 filed Feb. 10, 1978, now abandoned.

This invention relates to polyamide adhesive for bonding fabrics, particularly fusible interliners for fabrics, which are cleanable by laundering and/or dry cleaning. The polyamide adhesive is a terpolyamide of a caprolactam polymer, the polyamide of hexamethylene diamine and a polymeric fat acid and the polyamide of hexamethylene diamine and a co-dicarboxylic acid having 10-12 carbon atoms.

BACKGROUND OF THE INVENTION

Many attempts to use various polymers in fabric bonding have been found deficient in one or more regards, such as, (a) insufficient bonding, (b) little resistance to dry cleaning or laundering and (c) hand feel (too rigid to be comfortable when worn next to the skin). Recently U.S. Pat. No. 4,045,389 attempted to provide a satisfactory melt adhesive to overcome the deficiency in cleanability of textiles bonded with polyamide adhesive having certain melt viscosities within a relatively narrow range of 25-600 Pas measured at 200° C. obtained by using certain amounts of monocarboxylic acids as viscosity regulators. These polyamides were reaction products of caprolactam, various diamines and a mixture of dimerized fatty acids and other co-dicarboxylic acids.

In U.S. Pat. No. 3,859,234 there are disclosed polymeric fat acid copolyamides for bonding cleanable fabrics which utilize a mixture of hexamethylene diamine and xylylene diamine. These were satisfactory for bonding seams of fabric and were intended primarily for home use and thus adjusted for use with a home iron.

U.S. Pat. No. 3,772,136 was directed to fibrous products from thermoplastic polyamide polymers which included those made by the condensation polymerization of lactam or amino acids with various dicarboxylic acids and diamines including polymerized fatty acids.

Two publications which relate to textile adhesives are Adhaesion, 19 (11) pages 317-324 (1975) "Fusible Polyamide Adhesive for Bonding Textiles," Edward de-Jong, Plate Bonn Gmb. H. Bonn and Textilveredlung, Vol. 9, No. 1, pages 14-25 (1974) "Copolyamide Powders as Textile Melt Adhesives" Siegfried Schaff Emser Werke AG, Domat/Ems, Switzerland. The first indicates that dimerized (C-36 dicarboxylic acids) and ethylene diamine and its homologs, show no stability towards dry cleaning agents. The latter, which is cited in U.S. Pat. No. 4,045,389, indicates that polyamide and polyamine amides containing dimerized fatty acids are subject to the disadvantage of not being sufficiently stable against the solvent in dry cleaning.

SUMMARY OF THE PRESENT INVENTION

It was found that the compositions in the viscosity range of U.S. Pat. No. 4,045,389 were not satisfactory for bonding fusible interliners with fabrics. It was discovered, however, that those polymeric fat acid terpolyamides having a melt index at 175° C. of at least 30 and a melt viscosity of not more than 125 poise at 220° C. wherein the properties are controlled within certain ranges were satisfactory for this purpose. The resulting products were found to be satisfactorily cleanable by either laundering or dry cleaning. These terpolyamides are those which are thermal amidification products at 100°-300° C. for a time sufficient to effect amidification of (a) caprolactam, amino-caproic acid or mixtures thereof
(b) hexamethylene diamine and
(c) a mixture of polymeric fat acid and an aliphatic straight chain co-dicarboxylic acid having 10-12 carbon atoms.

The terpolyamide is one found employing substantially equivalent amounts of amine and carboxyl and in which the caprolactam polymer constitutes 25-30% by weight of the total polymer, the polyamide of hexamethylene diamine and the polymeric fat acid constitutes 45-55% by weight and the polyamide of the hexamethylene diamine and the co-dicarboxylic acid constitute 20-25% by weight.

The present invention is also directed to the method of adhering a fusible interliner to a fabric using the polyamide adhesive. This is carried out by dissolving the polyamide in a solvent therefor and spraying the solution so as to deposit a web of the polyamide on either the woven face fabric, such as cotton broadcloth, or the non-woven fabric interliner (usually a polyester non-woven fabric) after which the two are bonded. Alternatively, the web-like adhesive may be sprayed on to a release type support such as a tetrafluoroethylene fluorocarbon resin to form a mat which is later inserted between the face fabric and interliner prior to bonding. The web-like adhesive may also be formed by fibrillation of the molten polymer. The bonding of the face fabric and non-woven interliner is achieved by application of heat at bonding temperatures of preferably not less than 118° C.

DETAILED DESCRIPTION AND PREFERRED EMBODIMENTS

For successful bonding of fusible interliners it is desirable that the adhesive bond at 118° C. since many users have steam presses which cannot achieve higher temperatures. The dwell time for bonding should preferably not exceed eight seconds and such time was used in all the work set forth herein unless otherwise noted. Accordingly, any resins with a fusion point higher than 118° C. are eliminated from consideration. Bonding temperatures need not be limited to the lower range, however, because other users have electrically heated presses which can easily go higher. In view thereof bonding tests in the evaluation in this invention were run at 118° C., 127° C., 138° C., and 149° C.

Another requisite for polymers to be used in fusible interliners is that they be able to resist the damaging effects of hot water laundering and dry cleaning in the common dry cleaning solvents, trichloroethylene and perchloroethylene. After bonding at the four temperatures mentioned above, five specimens at each bonding temperature are pulled in 180° peel. These are called the "control" group. Other specimens are subjected to five cycles of laundering in aqueous "Tide" solution at 60° C. while others are dry cleaned five cycles with vigorous shaking in trichloroethylene. After these cleaning processes, five samples of each are tested for peel strength. In the tests conducted herein any samples which separate spontaneously during cleaning are designated with an F and the cycle causing failure is noted. Those remaining intact after five cycles of laundering or dry cleaning but having average peel values of less than 1 lb./2 in. are of questionable strength. Bonds having average values of greater than 1 lb./2 in. are considered as passing the test without reservation.

The third feature desirable for fusible interliners is good textile hand. This property is somewhat difficult to judge for those without extensive experience in fabricating textiles. It is believed, however, that the hand is closely related to the tensile secant modulus, a measure of stiffness in polymers. This property changes rapidly with time after molding the specimen as crystallinity or molecular order sets in. It approaches equilibrium at the end of one month's aging. Values of modulus referred to herein are those measured after one month's aging. The terpolyamides currently in use in fusible interliners have a value of near 50,000 psi. Accordingly the polymers of this invention all have moduli lower than this value, i.e., not more than 45,000 psi.

As indicated, the terpolyamides are prepared by amidification at temperatures of about 100°–300° C. for a time to effect amidification of (a) caprolactam, amino-caproic acid or mixtures thereof, (b) hexamethylene diamine and (c) a mixture of a polymeric fat acid and an aliphatic straight chain co-dicarboxylic acid having 10–12 carbon atoms.

Epsilon ($\epsilon$) caprolactam is preferred; however the corresponding amino-acid and mixtures thereof with the lactam may be employed. The co-dicarboxylic acids are those such as sebacic acid and dodecanedioic acid.

As indicated above, the polyamides are derived from polymeric fat acids. Polymeric fat acids are well known and commercially available. One method of preparation of polymeric fat acids can be seen in U.S. Pat. No. 3,157,681.

Typical compositions of commercially available undistilled polymeric fat acids, based on unsaturated $C_{18}$ fat acids (the mixture of acids derived from tall oil) are:

| | |
|---|---|
| $C_{18}$ monobasic or monomeric fat acids ("monomer") | 5–15% by wt. |
| $C_{36}$ dibasic or dimeric fat acids ("dimer") | 60–80% by wt. |
| $C_{54}$ (and higher) polybasic or trimeric fat acids ("trimer") | 10–35% by wt. |

While the foregoing available product is prepared by the polymerization of the mixture of ethylenically unsaturated fatty acids obtained from tall oil, similar polymeric fat acids may be prepared from other ethylenically unsaturated monocarboxylic acids.

The relative ratios of monomer, dimer and trimer in such unfractionated polymeric fat acids are dependent on the nature of the starting material and the conditions of polymerization. For the purposes of this invention, the term "monomeric fat acids" refers to the unpolymerized monomeric acids, the term "dimeric fat acids" refers to the dimer of the fat acids and the term "trimeric fat acids" refers to the residual higher polymeric forms consisting primarily of trimer acids but containing some higher polymeric forms. The term "polymeric fat acids" as used herein is intended to be generic to polymerized acids obtained from the ethylenically unsaturated fat acids and consists of a mixture of dimeric and trimeric fat acids, containing some residual monomeric fat acids.

The polymeric fat acids employed in the present invention are prepared by polymerizing ethylenically unsaturated monobasic carboxylic acids having 16 to 22 carbon atoms or the lower alkyl esters thereof. The preferred aliphatic acids are the mono and polyolefinically unsaturated 18 carbon atom acids. Representative octadecenoic acids are 4-octadecenoic, 5-octadecenoic, 6-octadecenoic (petroselinic), 7-octadecenoic, 8-octadecenoic, cis-9-octadecenoic (oleic), trans-9-octadecenoic (elaidic), 11-octadecenoic (vaccenic), 12-octadecenoic and the like. Representative octadecadienoic acids are 9,12 octadecadienoic (linoleic), 9,11-octadecadienoic, 10,12-octadecadienoic, 12,15-octadecadienoic and the like. Representative octadecatrienoic acids are 9,12,15-octadecatrienoic (linolenic), 6,9,12-octadecatrienoic, 9,11,13-octadecatrienoic (eleostearic), 10,12,14-octadecatrienoic (pseudo eleostearic) and the like. A representative 18 carbon atom acid having more than three double bonds is moroctic acid which is indicated to be 4,8,12,15-octadecatetraenoic acid. Representative of the less preferred (not as readily available commercially) acids are: 7-hexadecenoic, 9-hexadecenoic (palmitoleic), 9-eicosenoic (gadoleic), 11-eicosenoic, 6,10,14-hexadecatrienoic (hiragonic), 4,8,12,16-eicosatetraenoic, 4,8,12,15,18-eicosapentanoic (timnodonic), 13-docosenoic (erucic), 11-docosenoic (cetoleic), and the like.

The ethylenically unsaturated acids can be polymerized using known catalytic or non-catalytic polymerization techniques. With the use of heat alone, the monoolefinic acids (or the esters thereof) are polymerized at a very slow rate while the polyolefinic acids (or the esters thereof) are polymerized at a reasonable rate. If the double bonds of the polyolefinic acids are in conjugated positions, the polymerization is more rapid than when they are in the non-conjugated positions. Clay catalysts are commonly used to accelerate the polymerization of the unsaturated acids. Lower temperatures are generally used when a catalyst is employed.

Reference has been made hereinabove to the monomeric dimeric and trimeric fat acids present in the polymeric fat acids. The amounts of monomeric fat acids (often referred to as monomer), dimeric fat acids (often referred to as dimer), and trimeric or higher polymeric fat acids (often referred to as trimer) present in polymeric fat acids may be determined analytically by conventional gas-liquid chromatography of the corresponding methyl esters. Another method of determination is a micromolecular distillation analytical method. This method is that of R. F. Paschke et al., J. Am. Oil. Chem. Soc., XXXI (No. 1), 5, (1954), wherein the distillation is carried out under high vacuum (below 5 microns) and the monomeric fraction is calculated from the weight of product distilling at 155° C., the dimeric fraction calculated from the distilling between 155° C. and 250° C., and the trimeric (or higher) fraction is calculated based on the residue. Unless otherwise indicated herein, the chromatographic analytical method was employed in the analysis of the polymeric fat acids employed in this invention and all limitations on dimeric fat acid content herein are based on this method. When the gas-liquid chromatographic technique is employed, a portion intermediate between monomeric fat acids and dimeric fat acids is seen, and is termed herein merely as "intermediate", since the exact nature thereof is not fully known. For this reason, the dimeric fat acids value determined by this method is slightly lower than the value determined by the micromolecular distillation method. Generally, the monomeric fat acid content determined by the micromolecular distillation method will be somewhat higher than that of the chromatography method. Because of the difference of the two methods, there will be some variation in the values of the contents of various fat acid fractions. Unfortunately, there is no known simple direct mathematical relationship correlating the value of one technique with the other.

The polymeric fat acid employed to prepare the starting polyamides has a dimeric fat acid content, determined by gas-liquid chromatography of at least about 85% by weight (preferably greater than 90%). Where the initially polymerized fat acids have dimer contents below the above period, they are distilled to yield fractions having the requisite dimer content.

It is preferred that the polymeric fat acids are hydrogenated in order to improve the color thereof. The hydrogenation is accomplished using hydrogen under pressure in the presence of a hydrogenation catalyst. The catalysts generally employed in such hydrogenations are Ni, Co, Pt, Pd, Rh and others of the platinum family. In general, the catalyst is suspended on an inert carrier such as kieselguhr, commonly used with Ni. and carbon, commonly used with platinum family of catalysts.

In the Examples to follow, the polymeric fat acids were those obtained by polymerizing, distilling and hydrogenating the mixture of fat acids derived from tall oil (composed of approximately 40–45% linoleic and 50–55% oleic, such %'s being by weight).

Reference was made earlier above to the melt index and the melt viscosity of the polyamide adhesive. The polyamides should have a melt index measured at 175° C. of at least 30 and a melt viscosity measured at 220° C. of not more than 125 poises. Preferably the melt index is in the range of about 30–250 and the melt viscosity is in the range of about 30–125 poises.

The melt index is measured in accordance with ASTM 1238-73 (formerly ASTMD 1238-65T) and is expressed in terms of grams/10 minutes. In working with resins in the range of a high melt index (low viscosity) of about 50–250 grams/10 minutes, the procedure is modified in that the orifice is plugged to prevent extrusion of the sample during preheat time and the use of a 5 gram sample. After a preheat period of six minutes, a 2060 gram weight is used and the orifice plug is removed simultaneously with starting of the stop watch. The watch is stopped when the plunger stops its descent and the melt index calculated in accordance with the method as grams/10 minutes. The melt viscosity is measured in a Brookfield Thermosel viscometer in accordance with the operating procedure therefor and is measured at 220° C. The viscosity is controlled by the use of monomeric acid chain stoppers. Since the composition limits on the polymeric fat acid hexamethylene diamine component of the polymer is 50±5% the relationship of monomeric acids to dimer acids is used to describe this. The value which expresses this relationship is called the Kv value. It is calculated by the equation $Kv = M + I/4 - T/3$ in which M=monomer content of the dimer, I=intermediate content, and T=trimer acid content all expressed in percent by weight of total dimer composition. For the purposes of defining the viscosity limits of this invention M is defined as the total amount of monomeric acids in the composition including the monomer in the dimer and the added monomeric acids used to reduce viscosity.

For example, the polymeric fat acid used in all the preparations of the terpolyamides in the invention was

| Dimer | (D) | =93.1% |
| Intermediate | (I) | = 3.3% |
| Monomer | (M) | = 0.7% |
| Trimer | (T) | = 2.9% |

If 90 grams of dimer acids and 10 grams of stearic acid are used as a monomeric acid chain stopper, the Kv would be calculated as follows

| M = monomeric acids + stearic acid |
| = .007 × 90 = 0.63 grams + 10 grams |
| = 10.63 grams |
| D = .931 × 90 = 83.79 grams |
| I = .033 × 90 = 2.97 grams |
| T = .029 × 90 = 2.61 grams |
| M = 10.63% |
| I = 2.97 |
| D = 83.79 |
| T = 2.61 |
| $Kv = 10.63 + \frac{2.97}{4} - \frac{2.61}{3} =$ |
| = 10.63 + 0.74 − 0.87 = 10.50 |

The terpolyamides of the present invention have Kv values which fall between 6 and 14. The melt viscosity of polyamides produced between these limits lies between 30 and 125 poises measured at 220° C. The melt index measured at 175° C. on these resins lies in the range from 30 to 250.

The monomeric monocarboxylic acid employed as a chain stopper to regulate the molecular weight and thereby the Kv values and the properties of the satisfactory polyamides may be saturated or unsaturated monocarboxylic acid containing from 8–22 carbon atoms, preferably the 16–22 carbon atom fatty acids. This may be residual monomer obtained from an earlier polymerization to obtain polymeric fat acids. The preferred monocarboxylic acid employed for this purpose is stearic acid.

Earlier hereinabove reference was made to the dimeric fat acid content of the polymeric fat acids employed herein as greater than 80% by weight and preferably greater than 90%. In relation to the Kv values and the addition of monocarboxylic acid the 80% figure will preferably apply after the adjustments for Kv values by the addition of monocarboxylic acid. It is thus preferred that the polymeric fat acid contain at least 90% by weight of dimer which is then adjusted as needed or appropriate to the desired Kv value.

In the preparation of the polyamides of the present invention, the reactants are all charged to the reactor at the same time. The terpolyamide is referred to, however, in the usual conventional sense as though each polymer were formed individually and the percent by weight of each individual polymer is referred to in the total. Thus, the polyamide is referred to and defined by the weight percent content of the condensation of their individual starting reactants. In the further description and examples, the polyamides are also referred to in the conventional designation of nylon polymer such as nylon 6, or merely 6, in referring to the polycondensate of caprolactam. Thus, the polyamide of hexamethylene diamine and sebacic acid is designated 6,10 while the polyamide of hexamethylene diamine and dodecanedioic may be designated 6,12. In the case of the hydrogenated and distilled polymeric fat acids which are substantially dimeric, these may be designated HDD, and the polyamide thereof with hexamethylene diamine is designated as 6,HDD. The terpolyamides of the present invention may, accordingly, be described as 6,HDD/6,10/6 or 6,HDD/6,12/6 dependent on the co-dicarboxylic acid employed. In accordance with this convention the polyamides of the present invention can be described as a 6,HDD/6,10 or 12/6 terpolyamide wherein the weight ranges are 45-55/20-25/25-30% by weight of total polyamide. The preferred 6,HDD/6,12/6 polyamide is constituted by weight of 50/25/25.

The invention can be further illustrated by means of the following examples in which all parts and percentages are by weight unless otherwise indicated.

EXAMPLE I

Resin Preparation

All reactants were charged to a steel reactor kettle which was flushed with nitrogen three times and sealed. Agitation was begun and the reactor heated to 170°–180° C. and a pressure of 90–120 psi and held for 1½ hours. The reactor was vented to remove condensate and reduce pressure over a one hour period, applying heat at the start of venting and controlling venting to prevent cooling below 160° C. The reactor is then heated at a rate to attain 250° C. and 0 psi at approximately the same time and a temperature of 250°–260° C. with nitrogen purge maintained for 30 minutes. Vacuum (about 8 mm Hg pressure) is then applied for 2½ hours at 250° C. The product is then cooled slightly and discharged from the reactor.

EXAMPLE II

Resin Evaluation

A. In order to form a weblike deposit of polyamide on cotton broadcloth to later bond to non-woven fabric, a 10% by weight solution of polyamide is prepared in a 1:15 by weight solvent mixture of methyl alcohol and chloroform. The solution is sprayed on to cotton broadcloth to provide for a level of polyamide of 14 grams/sg. meter after which the cloth is dried in an oven for 20 minutes at 60° C.

B. To provide samples for evaluation as a control, after laundering and after dry cleaning the filament sprayed broadcloth is bonded to a polyester non-woven interliner by bonding in a Wabash press at 5 psi for 8 seconds at temperatures of 245° F., 260° F., 280° F., and 300° F. Areas of 8¼ inches by 8 inches are bonded with 1 inch at the top and bottom unbonded to provide unbonded areas to be held by the jaws of an Instron tester. Each specimen is cut into 2 inch by 4 inch pieces with a bonded area of 2 inches by 3 inches.

C. The bonded samples are then compared for bond strength on a control, after laundering and after dry cleaning using the following procedure:

(1) Aging at least overnight at 72° F. and 50% Relative Humidity (2) Dry cleaning—5 cycles
   (a) Samples are placed in a 1 gallon jar, one-half full of trichloroethylene and placed on a shaker for 2 minutes. After each cycle the sample is air dried.

(3) Laundry—5 cycles (14.7 gallons H₂O, 53.4 grams "Tide.")
   (a) The samples are washed at 140° F. with a normal wash of 14 minutes, spray and agitation rinse at 100° F. The total time is 30 minutes. The samples are then dried in 140° F. air oven for 20-25 minutes.

(4) The samples are then tested in an Instron Tester one day after laundering and dry cleaning using the conditions below and recording the peel value in pounds (lb) per 2 inches.
   (a) Conditions: 5 lb. full scale load, 12" crosshead speed, 5" crosshead distance, 2 inches per minute chart speed. If necessary, a switch to the 10 lb. scale load may be used.

EXAMPLE III

A series of polyamides were prepared in accordance with Example I and bonding samples prepared and evaluated in accordance with Example II. In the table below the tensile modulus was determined by ASTM D882-75 and the other properties as earlier described.

TABLE I

EVALUATION OF TERPOLYAMIDE 6.HDD/6,12/6–50/25/25%

| Resin | | Bond Temp. °C. | Peel (lb./2 in.) Original | After 5 Cycles Laundry | After 5 Cycles Dry Clean |
|---|---|---|---|---|---|
| A | | | | | |
| MI | = 109 | 118 | 2.9 | 2.1 | 2.7 |
| Mod | = 36300 | 127 | 3.1 | 2.2 | 2.7 |
| FT | = 95 | 138 | 2.8 | 2.5 | 2.4 |
| MV | = 47 | 149 | 2.7 | 2.5 | 2.0 |
| B&R MP | = 152 | | | | |
| Kv | = 10.7 | | | | |
| B | | | | | |
| MI | = 195 | 118 | 2.0 | 1.0 | 1.1 |
| Mod | = 39500 | 127 | 2.4 | 1.8 | 1.4 |
| FT | = 96 | 138 | 2.5 | 2.0 | 1.6 |
| Kv | = 12.7 | 149 | 2.7 | 2.2 | 2.1 |
| MV | = 36 | | | | |
| B&R MP | = 142 | | | | |
| C | | | | | |
| MI | = 47 | 118 | 1.3 | 1.2 | 1.1 |
| Mod | = 40600 | 127 | 2.0 | 1.4 | 1.8 |
| FT | = 104 | 138 | 2.5 | 1.8 | 2.0 |
| MV | = 111 | 149 | 2.6 | 1.9 | 2.0 |
| B&R MP | = 143 | | | | |
| Kv | = 8.6 | | | | |
| *D | | | | | |
| MI | = 218 | 118 | 3.4 | 2.0 | 2.0 |
| Mod | = 28200 | 127 | 3.4 | 2.6 | 2.6 |
| FT | = 98 | 138 | 3.4 | 2.4 | 2.6 |
| B&R MP | = 136 | 149 | 2.7 | 2.2 | 2.2 |
| Kv | = 10.7 | | | | |
| E | | | | | |
| MI | = 136 | 118 | 2.4 | 1.5 | 2.0 |
| Mod | = 34500 | 127 | 3.0 | 2.2 | 2.9 |
| FT | = 101 | 138 | 3.6 | 2.4 | 2.2 |
| B&R MP | = 150 | 149 | 3.4 | 2.8 | 2.8 |
| Kv | = 10.7 | | | | |
| **F | | | | | |
| MI | = 157 | 118 | 1.5 | 0.9 | 1.3 |
| FT | = 94 | 127 | 2.4 | 1.6 | 2.2 |
| B&R MP | = 143 | 138 | 2.9 | 1.8 | 1.7 |
| Kv | = 10.7 | 149 | 3.2 | 2.3 | 2.0 |
| ***G | | | | | |
| MI | = 58 | 118 | 2.3 | 1.9 | 1.9 |
| FT | = 104 | 127 | 2.6 | 2.4 | 2.5 |
| B&R MP | = 150 | 138 | 3.0 | 2.2 | 2.5 |
| Kv | = 10.3 | 149 | 2.7 | 2.3 | 2.6 |

MI = Melt Index
MV = Melt Viscosity (poises)
Mod = Modulus (psi)
FT = Fusion Temperature (°C.)
B&R MP = Ball & Ring Melting Point (° C.)
*Resin A + 3.4% Residual Caprolactam
**Resin A + 5% Low Density Polyethylene
***6,HDD/6,10/6–50/25/25%

TABLE I-continued

| Resin | HDD | Stearic Acid | Dodecane-dioic Acid | Hexa-methylene Diamine | Capro-Lactam |
|---|---|---|---|---|---|
| A | 249.8 | 28.5 | 117.7 | 167.5 | 159.5 |
| B | 244.0 | 34.0 | 118.0 | 167.0 | 159.0 |
| C | 255.0 | 23.0 | 118.0 | 167.0 | 159.0 |
| D (a) | 249.8 | 28.5 | 117.7 | 167.5 | 159.5 |
| E | 249.8 | 28.5 | 117.7 | 170.1 | 159.5 |
| F | 160 grams resin A plus low density polyethylene (chemplex Type 1026) | | | | |
| G | 238.8 | 26.0 | 108.0 (b) | 167.5 | 151.8 |

(a) Vacuum, 15 mm. instead of 1 mm. or lower.
(b) Sebacic acid instead of dodecanedioic acid.

EXAMPLE IV

Table II below shows the Kv value, viscosity and melt index data on other terpolyamides of the present invention for the 6,HDD/6,12/6 products at the weight ratios noted. Again, the resins were prepared in accordance with Example I.

TABLE II

| Wt. Ratio | Kv | Thermosel Viscosity (Poises) 220° C. | Melt Index (175° C.) |
|---|---|---|---|
| (50/25/25) | 6.5 | 100 | 34 |
| (50/20/30) | 10.5 | 66 | 201 |
| (55/20/25) | 10.4 | 45 | 158 |
| (45/25/30) | 12.5 | 63 | 110 |
| *(55/20/25) | 10.8 | 53 | 123 |

*6,HDD/6,10/6

Additional bondings were made at 104° C. with steam employing Resins A, D and F of Example III and at temperatures of 163° and 177° C. employing Resins A, B, C and D of Example III, to extend the evaluation at a depressed and further elevated temperatures. The results remained excellent particularly at the elevated temperatures.

Attempts to substitute a co-dicarboxylic acid such as adipic, azelaic or a $C_{19}$ dicarboxylic acid resulted in products which were deficient in one or more regards.

EXAMPLE V

For further comparison a current commercial product not employing polymeric fat acids and believed to be a 6/6,6/12 polymer at weight ratios of 38/18/44 was evaluated as in Example III. This commercial product has a relatively high modulus and, accordingly, a less desirable textile hand (two batches of polymer measuring 47300 and 53300 psi). The resin has a melt index of 45 and a fusion temperature of 110° C. The results thereof were as follows:

| Bond Temp. °C. | Original | Peel (lb./2 in.) After 5 Cycles Laundry | After 5 Cycles Dry Clean |
|---|---|---|---|
| 118 | 2.0 | 1.4 | 1.6 |
| 127 | 2.7 | 1.6 | 1.8 |
| 138 | 2.0 | 1.9 | 2.0 |
| 149 | 3.4 | 2.7 | 2.8 |

EXAMPLE VI

In order to illustrate the use of a non-hydrogenated polymeric fat acid (DD), a polyamide was prepared from non-hydrogenated distilled polymerized tall oil fatty acids having the following analysis

| %M | = | 1.3 |
|---|---|---|
| %T | = | 2.7 |
| %D | = | 94.7 |
| %T | = | 1.3 |
| Saponification Value | = | 196.3 |
| Kv | = | 1.53 |

The terpolyamide, 6,DD/6,12/6 at a weight ratio of 50/25/25, was prepared in the manner as described in Example I. The terpolyamide resulting was analyzed as follows:

acid = 9 meq/kg
Amine = 67 meq/kg
B&R MP = 143° C.
Melt Index (175° C.) = 145
Fusion Point = 98° C.
Inh. Visc. = 0.400
Thermosel viscosity (175° C.) = 515 poises
Tensile strength = 2970 psi
% Elongation = 517
Tensile modulus, 2% secant, 1 month = 28,600 psi When this resin was formed into a fibrous web of 15 grams/m and used to bond non-woven interliner to cotton fabric at four temperatures and then some samples laundered and others dry cleaned according to previously described conditions, the bond values were as follows:

| Bond Temp. °C. | Original | Peel (lb./2in.) After 5 Cycles Laundry | After 5 Cycles Dry Clean |
|---|---|---|---|
| 118 | 3.2 | 1.5 | 1.9 |
| 127 | 3.5 | 2.2 | 2.8 |
| 138 | 4.4 | 3.1 | 3.9 |
| 149 | 4.5 | 3.8 | 3.3 |

This terpolyamide was slightly yellow when compared with resins produced from hydrogenated distilled dimer but was otherwise as strong and as good an adhesive as the other terpolyamides.

EXAMPLE VII

A large scale batch of the terpolyamide 6,HDD/6,12/6 (50/25/25) was prepared for formation into a reticulated web. The polyamide was prepared from the following reactants and amounts thereof:

| *Polymeric Fat Acids | 284.9 pounds |
|---|---|
| Dodecanedioic Acid | 141.5 pounds |
| **Hexamethylene Diamine | 201.0 pounds |
| Caprolactam | 190.7 pounds |
| Stearic Acid | 26.72 pounds |

*Hydrogenated and distilled polymerized tall oil fatty acids having analysis
| %M | 0.7 |
|---|---|
| %I | 2.5 |
| %D | 92.9 |
| $T | 3.9 |

**70% aqueous solution

After charging all the reactants except about 100 milliequivalents of polymeric fat acids to a reactor which was then heated to a temperature of 245° C., vacuum was applied and the temperature maintained. After about five hours, addition of a total of 19.5 pounds of polymeric fat acids and 22.2 pounds of caprolactam was added while maintaining the temperature to provide a product with a melt index of 106, % elongation of 449 and tensile strength of 2580 psi.

The foregoing polyamide (200 pounds) was converted into a reticulated web according to the process described in U.S. Pat. No. 4,085,175 assigned to PNC Corporation. A 400 foot roll of the web, 51.5 inches wide, was examined for uniformity and evaluated for bonding performance. Twelve square pieces were cut from this roll and weighed accurately. The mean value for the twelve identical squares was 36.4 grams per square meter with a standard deviation of 2.735. This web was used to bond 100% cotton fabric weighing 102 g/m$^2$ to a polyester nonwoven fabric weighing 40 g/m$^2$ at four temperatures using eight seconds press time at 10 psi pressure. Five strips of fabric bond were pulled in peel in an Instron Tester one day after the bonds were made. Five bonds were also tested for peel after 5 cycles in a home washing machine using water at 140° F. and Tide detergent, forced warm air drying between each cycle. Five bonds were tested after 5 cycles of dry cleaning in trichloroethylene, air drying between each cycle. The results of this bonding and cleaning study are shown in Table III below.

An aqueous suspension of the polyamide was produced at 30% resin solids and having a particle size range such that at 86 microns, 50% of the particles were larger and 50% were smaller. Half of the particles were between 54 and 112 microns in size. This suspension was printed on to cotton fabric in a uniform dot pattern at a density of 21 grams/m$^2$ after drying in a forced air oven. Bonds made between this fabric with a dot adhesive pattern to another piece of uncoated cotton fabric at 245° F. had a peel value of 2.2 lbs/in. After five cycles of home laundering, the bond value was 1.7 lbs/in. After five dry cleaning cycles, the bond value was 2.2 lbs/in.

TABLE III

| | BONDING AND CLEANING TESTS | | |
|---|---|---|---|
| | Peel Value (lb/in) | | |
| Bond Temp. °F. | Original | After 5 Cycles Laundry | After 5 Cycles Dry Clean |
| 245 | 3.95 | 1.10 | 2.20 |
| 260 | 4.15 | 1.30 | 2.50 |
| 280 | 4.60 | 1.45 | 3.40 |
| 300 | 5.45 | 3.40 | 4.15 |

The embodiments of the invention in which an exclusive property of privilege is claimed are defined as follows:

1. A polyamide adhesive adapted for bonding of fusible interliners for fabrics which are cleanable comprising a polymeric fat acid terpolyamide having a melt index at 175° C. of at least 30 and a melt viscosity of not more than 125 poises at 220° C. and a tensile secant modulus not more than about 45,000, said terpolyamide being the thermal amidification product at a temperature of about 100°–300° C. for a time sufficient to effect amidification of
   (a) caprolactam, amino-caproic acid or mixtures thereof,
   (b) hexamethylene diamine and
   (c) a mixture of a polymeric fat acid and an aliphatic straight chain co-dicarboxylic acid having 10–12 carbon atoms
wherein substantially equal amounts of amine and carboxyl are employed to provide a terpolyamide product wherein the caprolactam is present in an amount of 25–30% by weight, the polyamide of said hexamethylene diamine and said polymeric fat acid is present in an amount of 45–55% by weight and the polyamide of said hexamethylene diamine and said co-dicarboxylic acid is present in an amount of 20–25% by weight of the terpolyamide.

2. The polyamide adhesive as defined in claim 1 wherein said melt index is in the range of about 30–250 and said melt viscosity is in the range of about 30–125 poise.

3. A polyamide adhesive as defined in claim 2 wherein said polyamide is prepared from a polymeric fat acid containing monomeric monocarboxylic acid in an amount to provide a Kv value in the range of 6–14.

4. A polyamide adhesive as defined in claim 3 wherein said polymeric fat acid after addition of any of said monocarboxylic acid to adjust said Kv value within said range contains at least about 80% dimeric fat acid by weight.

5. A polyamide adhesive as defined in claim 2 wherein said polymeric fat acid is obtained by polymerization of 16–22 carbon atom ethylenically unsaturated monocarboxylic acids.

6. A polyamide adhesive as defined in claim 2 wherein said polymeric fat acid is obtained by polymerization of 18 carbon atom ethylenically unsaturated monocarboxylic acids.

7. A polyamide adhesive as defined in claim 6 wherein said 18 carbon atom acids are the mixture of acids obtained from tall oil.

8. A polyamide adhesive as defined in claim 7 wherein said polymeric fat acids obtained from said tall oil are hydrogenated and distilled to provide a polymeric fat acid having a dimeric fat acid content greater than 90% by weight.

9. A polyamide adhesive as defined in claim 1 wherein said co-dicarboxylic acid is sebacic acid.

10. A polyamide adhesive as defined in claim 1 wherein said co-dicarboxylic acid is dodecanedioic acid.

11. In a method of adhering a fusible non-woven interliner to a fabric with a polyamide adhesive the improvement wherein said adhesive is the polyamide defined in claim 1.

12. A method as defined in claim 11 wherein said interliner is bonded to a woven fabric wherein said polyamide adhesive has been deposited in the form of a web.

13. A method as defined in claim 12 wherein said fabric is cotton broadcloth.

14. A method as defined in claim 13 wherein said interliner is bonded to said fabric by the application of heat in a bonding temperature not less than 118° C.

* * * * *

UNITED STATES PATENT AND TRADEMARK OFFICE
CERTIFICATE OF CORRECTION

PATENT NO. : 4,217,256
DATED : August 12, 1980
INVENTOR(S) : Dwight E. Peerman and Gordon Kanten It is certified that error appears in the above-identified patent and that said Letters Patent are hereby corrected as shown below:

At column 7, line 43, the phrase "grams/sg. meter" should read:

---grams/sq. meter---

In the Abstract, last line, the phrase "having 20-22 carbon atoms." should read:

---having 10-12 carbon atoms.---

Signed and Sealed this

Fourth Day of December 1984

[SEAL]

Attest:

GERALD J. MOSSINGHOFF

Attesting Officer    Commissioner of Patents and Trademarks